A. N. PIERMAN.
MOTION PICTURE FILM CARTON.
APPLICATION FILED NOV. 26, 1913.
1,106,676.
Patented Aug. 11, 1914.
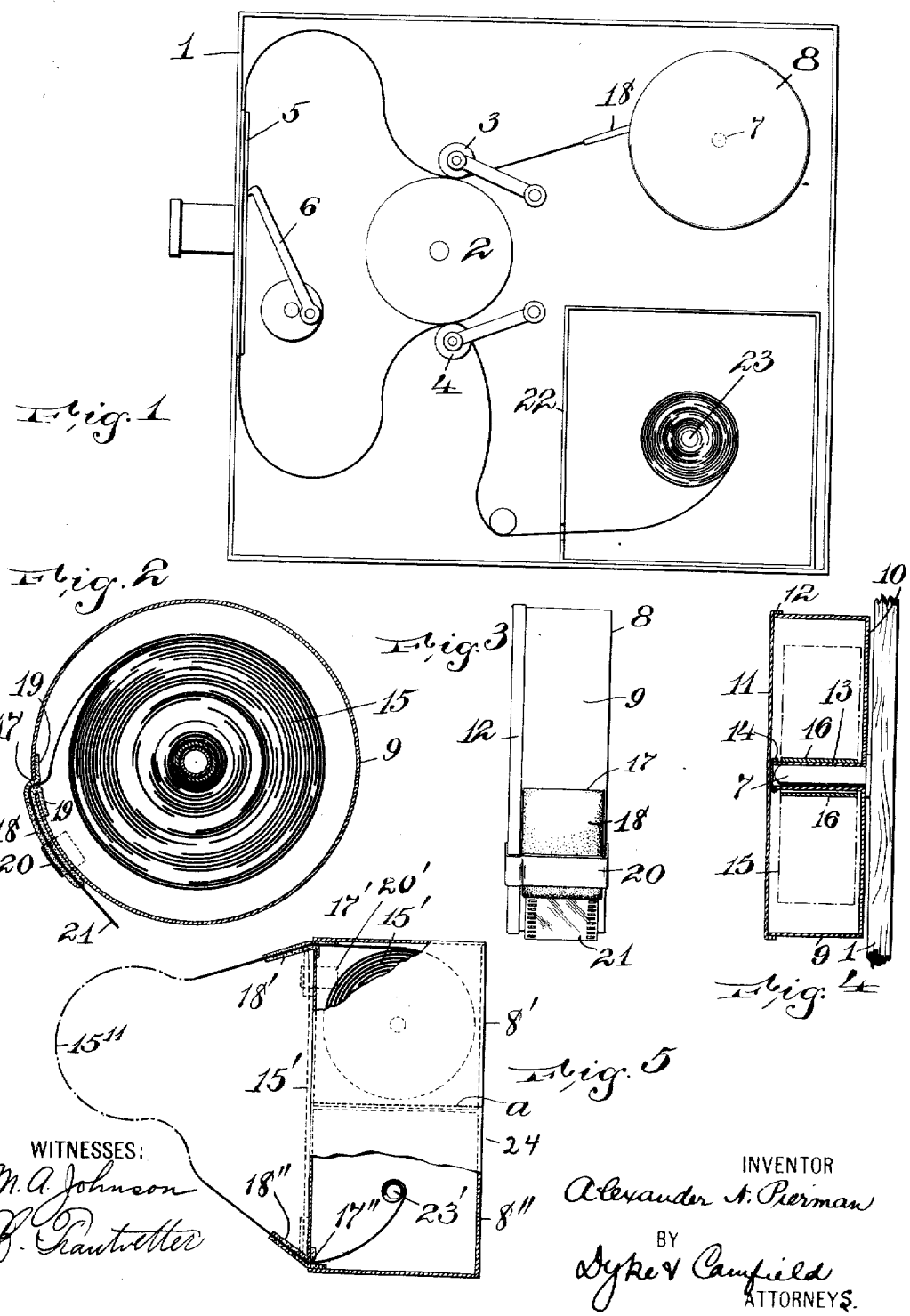

UNITED STATES PATENT OFFICE.

ALEXANDER N. PIERMAN, OF NEWARK, NEW JERSEY.

MOTION-PICTURE-FILM CARTON.

1,106,676. Specification of Letters Patent. Patented Aug. 11, 1914.

Application filed November 26, 1913. Serial No. 803,132.

*To all whom it may concern:*

Be it known that I, ALEXANDER N. PIERMAN, a citizen of the United States, and a resident of Newark, in the county of Essex and State of New Jersey, have invented certain new and useful Improvements in Motion-Picture-Film Cartons, of which the following is a specification.

My invention relates to cartons for photographic films, and more especially to the provision of an improved carton for containing sensitized film for making motion picture negatives, and which carton can be inserted in a motion picture camera in the form in which it is shipped and received, without rewinding or change of any kind, and the film unwound directly therefrom by the feeding mechanism of the camera, thus making the motion picture camera a practical day-light loading camera.

In the past it has been customary for the film to be wound in rolls of the length wanted at the film factory, secured at the outer end to prevent unwinding, and the rolls so formed packed in ordinary cylindrical cartons, and when the package is received by the camera operator it has been necessary for him to rewind the sensitized film in a dark room, either in the camera itself, or if additional lengths are desired to be thereafter inserted in the camera, he is obliged to wind it in a sort of dummy camera, commonly known as a "retort", and such retort is carried by the operator to be later inserted in the camera in a space arranged for that purpose, when the film contained therein is needed for use. This extra operation of rewinding, to which the sensitized film is subjected between its production at the factory and its exposure in the camera, is highly objectionable for many reasons, as there is danger of light getting to the sensitized film during the operation; the careful exclusion of dust from the air is not practicable as at the factory where the film is made, and dust may get on the film, causing light spots and other harmful effects due to the presence of dust; finger marks and marks caused by the rewinding apparatus may be made on the film; the film is occasionally broken in this rewinding operation; and because deterioration may be caused in this and many other ways during such rewinding operation, and further, because of the time and trouble necessarily involved in such rewinding operation, it is desirable that any rewinding of the film between the time it leaves the factory and its exposure in the camera should be dispensed with.

With a film carton constructed in accordance with my invention, all the objectionable features referred to are eliminated, and it is possible, with little or no additional expense above the cost of packing in cartons in the manner now practised, to entirely do away with the rewinding operation referred to, and to place the film in its carton, as received from the manufacturer, directly in the motion picture camera ready for exposure. In other words, a carton constructed in accordance with my invention takes the place of the usual shipping carton now in use, and also of the retort into which the film now has to be wound in a dark room, before the camera can be loaded in day-light.

After the length of film packed in my improved carton has been exposed, the carton, which is extremely cheap, can be thrown away, just as the present cartons are discarded after the film is taken therefrom, and there is no longer the necessity of taking back the empty retorts to the studio after their contents have been exposed in the camera.

In accordance with a modification of my invention, the loading and unloading of the motion picture camera may be still further simplified by the provision of an aditional carton for receiving the exposed film, which may be attached to the carton containing the unexposed sensitized film, with its end secured to a winding spool in the receiving carton, and a loop of film is left projecting outside the carton for threading in the camera. With such arrangement it is only necessary to place said combination package, which may be made complete at the factory, in the camera, and to thread the projecting loop of films into place in the camera, and when the exposure has been completed and the exposed film wound up in the receiving carton, the package can be removed with the film in the receiving carton, and the carton originally containing the sensitized film may be torn off and thrown away.

With the foregoing and related objects in view, my invention consists in the parts, combinations and improvements herein set forth, and while I have illustrated and shall describe certain embodiments of my invention, it is to be understood that same are for purposes of illustration only, and that my invention is not confined thereto, but that changes may be made in the construction shown within the scope of my claims, without departing from my invention or sacrificing any of the advantages thereof.

In the drawings forming a part of this specification, Figure 1 is a diagrammatical view of a motion picture camera, having therein a film carton, involving one form of my invention; Fig. 2 is a view in central, vertical cross-section of a carton, as shown in Fig. 1, and containing a film packed therein, and sealed, ready for shipment; Fig. 3 is an edge view of the carton shown in Fig. 2; Fig. 4 is a cross-sectional view taken at right angles to Fig. 2, and also showing a fragment of a camera in which the carton is received, and Fig. 5 is a view, partly in side elevation and partly in cross-section, with parts broken away, of a modified form of carton.

In the said drawings, the same reference characters are uniformly applied to designate the same parts throughout the several views.

Reference character 1 is applied to designate a motion picture camera which may be of any preferred form. As shown, such camera comprises a centrally disposed feed wheel 2, presser wheels 3 and 4 for keeping the film in contact therewith, film gate 5 and intermittent feeding mechanism as 6, all of which, together with the usual winding up apparatus, may be operated in any well known manner as will be understood. Such camera is provided with a peg 7 for receiving the film to be exposed.

My improved carton, as shown in Figs. 1–4, is indicated generally by the reference character 8. The outer wall 9 of the carton is preferably cylindrical in form, as is customary, and the heads thereof are represented at 10 and 11 respectively. Such wall and heads may be formed of any material which is convenient or desirable, but a comparatively heavy paste-board or card-board is preferably made use of for such purpose. The head 10 is permanently attached to the side walls 9, and the head 11 is formed as a cover for the box or carton, being preferably provided with a flange 12 for attachment thereto, but said head or cover 11 may be of any preferred form, and may be attached to the body of the carton in any desired manner. A tube 13 is secured centrally to the wall 10 of the carton, and extends substantially across the same to the neighborhood of the cover 11, with which it may come in contact, if desired, and the end of such tube is preferably closed, as by pasting a piece of paper thereover, as indicated at 14, although such cover may be placed over the opposite end of the tube 13 if desired. Such cover prevents the access of light to the interior of the carton through the tube 13.

The sensitized film is indicated by the reference character 15, and is preferably coiled upon a tube 16 of a size to fit and turn readily upon the inner tube 13, and such tube 16 may be of any desired material, paste-board or card-board being the preferable material for such purpose. The wall 9 of the carton is provided with a transverse film slot 17, and a flat tube 18, of velvet or like soft flexible material, preferably black in color, and light-proof, is extended through the slot 17, and the ends secured to the interior of the wall 9 on each side of the slot, is indicated at 19, 19. The tube 18 forms a flexible conduit through which the film may be drawn without danger of light reaching the film contained in the interior of the carton.

In packing the sensitized film in the carton, a suitable length of film is wound on the tube 16, and the cover 11 being removed from the carton, the film is inserted within the carton, the tube 16 being slipped over the inner tube 13, and the end of the film is passed out of the carton through the slot 17 and the flexible light-proof tube 18, the cover 11 secured in place, and the package sealed, as by means of a paster or other sealing device 20, which is passed over the flexible film conduit 18, and preferably extended for a distance back upon the walls 10 and 11 of the carton, and secured thereto, as by being pasted or glued thereon, thus effectively holding the flexible tube 18 and the end of the film firmly in contact with the outer wall of the carton, and preventing all access of light thereto, and leaving the end 21 of the film projecting therefrom. The package so formed is preferably covered with a wrapping of paper or other material, and the film having been packed in the carton in the manner described, is ready for shipment.

When the camera operator receives the length of film, packed in the manner described, the same is ready for insertion in the camera, without the necessity of rewinding, and the carton, as described, with its outer wrapping, of course, removed, may be placed directly in the camera with the central tube 13 fitting upon the peg 7, with which the camera is provided, and which projects from one of the walls of the camera. Upon placing the carton, which has been described, in the camera shown diagrammatically in Fig. 1, it is only necessary to break the seal 20, and draw out a sufficient length of film to thread the camera, as by passing the same between the feed wheel 2 and the presser wheel 3, through the gate 5 into contact with an intermittent feeding means, as 6, and between the feed wheel 2 and the presser wheel 4, and into the receiving retort 23, where the film may be wound, as on a spool 23. It will be seen that in the unreeling of the sensitized film, during the process of exposing the same in the camera, the carton, as described, is substantially self-adjusting, by reason of the fact that the carton is therefore free to assume various angular positions, and to permit the greatest possible freedom in the discharge of the film through the velvet or other flexible tube 18, the angular position of the carton and film conduit being determined by the amount of film drawn off as will be understood.

In Fig. 5 I have shown a modified form of my invention, which comprises a carton, 24, shown as of rectangular construction, and comprising a film containing compartment 8' provided with a flexible outlet tube 18', through which the film may pass, and which may be sealed in place, as by means of the seal 20', and a separate receiving compartment 8", the walls of which are preferably in line with the walls of the carton 8', and which is provided with a winding spool 23', and with an inlet slot 17" provided with a flexible tube 18" of velvet or similar material, in the same manner as described, with reference to the slot 17. The walls of the portion 8' of such carton combination package are preferably scored, as indicated at a. The position of the parts, when the package is complete and ready for shipment, is indicated in dotted lines in Fig. 5. The film 15', after having passed out through the flexible outlet tube 18', enters the similar tube 18", and is secured to the winding spool 23'. In threading the film into the camera, a loop may be drawn out, as indicated in 15", and the film threaded in place in the camera, it being understood that when a package of this character is used, the camera to be made use of must be of a construction which will permit the sidewise threading of a loop of film therein, without the necessity of inserting the end of the film between any of the members of the feeding apparatus.

With a carton constructed in accordance with the modification described, and as shown in Fig. 5, it will be apparent that after the same has been inserted in the camera and the film threaded therein, and exposed, so that all the film is wound upon the spool in the compartment 8", it will only be necessary to close the slot 17", as by sealing the tube 18" to the wall of the carton, as by means of a seal similar to seal 20, or to close such opening in any desired manner, as by snapping a rubber band around the carton and tube 18" and that when this has been done, the exposed film being contained within the compartment 8", the portion 8' of the carton, in which the film was contained, during shipment, may be torn off at the scored line a, and thrown away.

While I have shown the combination package of Fig. 5, for convenience, as having straight sides, it will be understood that such package may be made in other forms than that shown, so long as a shipping and receiving compartment, as described, are provided.

Having now described my invention, I claim:

1. A container for motion picture films, comprising side and end walls, a slot being provided therein, a flexible light excluding conduit for the film at such slot, and said container being provided with a central bearing, whereby the container may be used for shipping with a film therein and the film in its container may be inserted directly in a motion picture camera for exposure without intermediate rewinding of the film, substantially as set forth.

2. A carton for motion picture films provided with a slot in the wall thereof, and a flat tube of flexible, light-proof material secured thereto about said slot and adapted to protect the interior of the carton from access of light thereto as the film passes through said slot, substantially as set forth.

3. A carton for motion picture films having a slot formed in its wall, a central tube permanently secured therein, and a flexible, light excluding conduit connected to the carton wall about said slot, substantially as set forth.

4. In a carton for motion picture films, side walls, an end permanently secured thereto, a tube secured to said end and adapted to be received on a film peg in a motion picture camera, a cover for the opposite end of said carton, said side walls having a slot formed therein through which the film may pass, and a flexible, light tight conduit extending through and projecting from said slot and secured to the said side walls on the interior of said carton, substantially as set forth.

5. In a carton for motion picture films, side walls, said side walls being provided with a film slot, a flexible light proof conduit for said film about said slot, an end wall permanently secured to said side walls, a tube secured centrally to said end wall, and a cover for the opposite end, substantially as set forth.

6. A combination package comprising a light-tight shipping light tight carton for motion picture films, and a carton for receiving the film after exposure, said cartons being detachably secured together, substantially as set forth.

7. In a carton for moving picture films, a light tight film receiving compartment, means therein for winding up a film, and a second film compartment secured to the first named compartment, and detachable therefrom, substantially as set forth.

8. A package for motion picture films, comprising a film containing carton and a film receiving carton detachably secured thereto, each of said cartons being provided with a film slot and a flexible light excluding conduit, substantially as set forth.

9. A combination package comprising a shipping carton for motion picture films, and a carton for receiving the film after exposure in a motion picture camera, said cartons being detachably secured together, and each of said cartons being provided with a slot for the passage of the film, and means for preventing access of light through said slot, substantially as set forth.

10. A carton for motion picture films provided with a slot to permit passage of the film, and a lining of soft fabric about said slot and said lining being extended outwardly to exclude light from the carton, substantially as set forth.

11. A carton for motion picture films provided with a slot for the passage of the film, and a light tight duct of soft material attached to the carton walls and extending through said slot, substantially as set forth.

In testimony that I claim the foregoing, I have hereto set my hand, this 22nd day of November, 1913.

ALEXANDER N. PIERMAN.

Witnesses:
H. H. DYKE,
M. A. JOHNSON.

Corrections in Letters Patent No. 1,106,676.

It is hereby certified that in Letters Patent No. 1,106,676, granted August 11, 1914, upon the application of Alexander N. Pierman, of Newark, New Jersey, for an improvement in "Motion-Picture-Film Cartons," errors appear in the printed specification requiring correction as follows: Page 3, line 116, second occurrence, strike out the words "light tight"; same page, line 117, before the word "carton" insert the words *light tight;* same page, line 124, after the word "second" insert the words *light tight;* and that the said Letters Patent should be read with these corrections therein that the same may conform to the record of the case in the Patent Office.

Signed and sealed this 1st day of September, A. D., 1914.

[SEAL.]

R. F. WHITEHEAD,
*Acting Commissioner of Patents.*